(12) United States Patent
Mazarguil

(10) Patent No.: US 9,540,098 B2
(45) Date of Patent: Jan. 10, 2017

(54) AIRCRAFT LANDING GEAR EQUIPPED WITH MEANS FOR DRIVING IN ROTATION WHEELS CARRIED BY THE LANDING GEAR

(71) Applicant: MESSIER-BUGATTI-DOWTY, Velizy-Villacoublay (FR)

(72) Inventor: Nicolas Mazarguil, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 59 days.

(21) Appl. No.: 14/504,605

(22) Filed: Oct. 2, 2014

(65) Prior Publication Data

US 2015/0321751 A1 Nov. 12, 2015

(30) Foreign Application Priority Data

Oct. 4, 2013 (FR) ...................................... 13 59627

(51) Int. Cl.
*B64C 25/40* (2006.01)
*B64C 25/34* (2006.01)

(52) U.S. Cl.
CPC ............ *B64C 25/405* (2013.01); *B64C 25/34* (2013.01); *Y02T 50/823* (2013.01)

(58) Field of Classification Search
CPC .......... B64C 25/00; B64C 25/02; B64C 25/18; B64C 25/24; B64C 25/405
See application file for complete search history.

(56) References Cited

U.S. PATENT DOCUMENTS

| | | | | |
|---|---|---|---|---|
| 1,812,143 | A * | 6/1931 | Dugan | B64C 15/12 244/103 S |
| 2,320,547 | A * | 6/1943 | Tiger | B64C 25/40 244/103 S |
| 2,425,583 | A * | 8/1947 | Volk | B64C 25/40 244/103 S |
| 2,454,947 | A * | 11/1948 | Schroeder | B64C 25/40 180/10 |
| 2,460,387 | A * | 2/1949 | Hunter | B64C 25/405 244/103 R |
| 3,814,354 | A | 6/1974 | Reese | |
| 8,646,722 | B2 * | 2/2014 | Elliot | B64C 25/50 244/50 |
| 9,290,264 | B2 * | 3/2016 | Charles | B64C 25/405 |
| 2010/0147995 | A1 | 6/2010 | Cros et al. | |
| 2012/0153075 | A1 * | 6/2012 | Wilson | B64C 25/405 244/50 |

(Continued)

OTHER PUBLICATIONS

French Preliminary Search Report of FR 13 59627 dated Jul. 2, 2014.

*Primary Examiner* — Tien Dinh
*Assistant Examiner* — Michael A Fabula
(74) *Attorney, Agent, or Firm* — Sughrue Mion, PLLC

(57) ABSTRACT

A landing gear that comprises an axle (2) and a wheel (3, 3'). The wheel comprises a rim (4, 4') mounted so as to rotate on the axle about a first axis of rotation (X), first blocks protruding from a lateral face (F, F') of the rim, the first blocks being adapted to cooperate with a gearwheel (8) of a drive actuator (7) carried by the landing gear. The gearwheel is mounted rotatably about a second axis of rotation (Y) perpendicular to the first axis of rotation.

16 Claims, 5 Drawing Sheets

(56) References Cited

U.S. PATENT DOCUMENTS

| | | | | |
|---|---|---|---|---|
| 2012/0217340 A1* | 8/2012 | Essinger | ............... | B64C 25/405 |
| | | | | 244/50 |
| 2013/0026284 A1* | 1/2013 | Christensen | .......... | B64C 25/405 |
| | | | | 244/50 |
| 2013/0200210 A1* | 8/2013 | Oswald | ................. | B64C 25/405 |
| | | | | 244/50 |
| 2013/0233969 A1* | 9/2013 | Charles | ................... | B64C 25/36 |
| | | | | 244/103 R |
| 2014/0091173 A1* | 4/2014 | Barbu | ..................... | B64C 25/36 |
| | | | | 244/50 |
| 2014/0187370 A1* | 7/2014 | Walsh | ................... | F16H 7/0827 |
| | | | | 474/121 |
| 2014/0225421 A1* | 8/2014 | Oswald | ................. | B64C 25/405 |
| | | | | 301/6.2 |
| 2014/0246539 A1* | 9/2014 | Didey | ................... | B64C 25/405 |
| | | | | 244/50 |
| 2014/0284421 A1* | 9/2014 | Osman | ................. | B64C 25/405 |
| | | | | 244/50 |
| 2014/0353423 A1* | 12/2014 | Himmelmann | ....... | B64C 25/405 |
| | | | | 244/50 |
| 2015/0027256 A1* | 1/2015 | Rodrigues | ................. | F16H 1/06 |
| | | | | 74/411.5 |
| 2015/0210385 A1* | 7/2015 | Didey | ................... | B64C 25/405 |
| | | | | 244/50 |

* cited by examiner

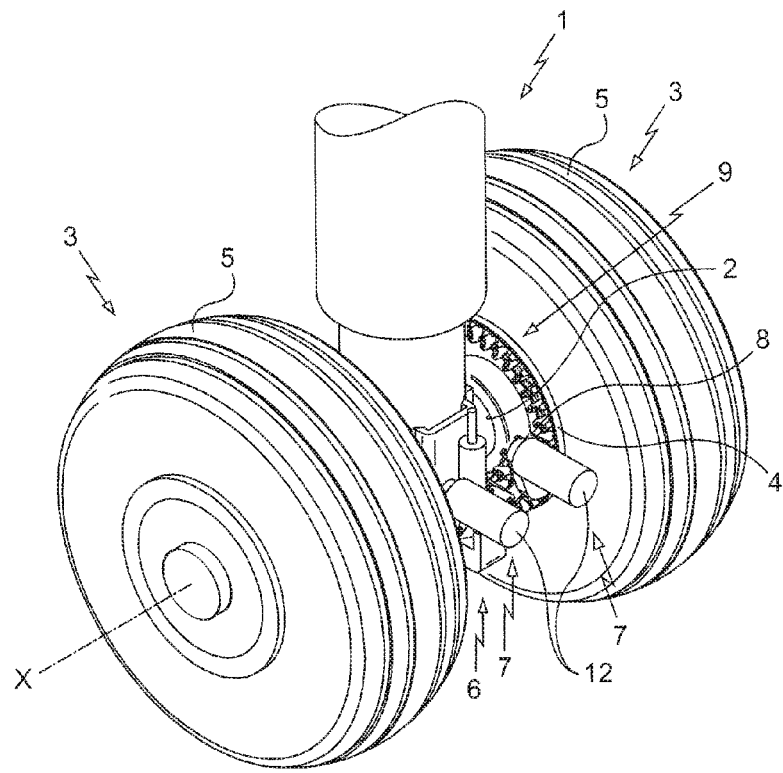
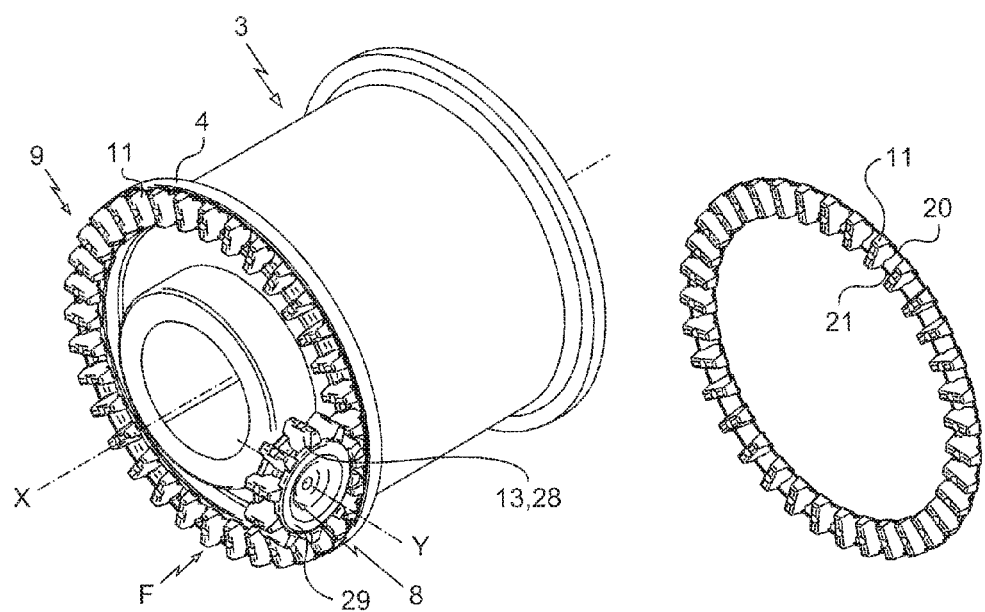
Fig. 1
Fig. 2    Fig. 5

AIRCRAFT LANDING GEAR EQUIPPED WITH MEANS FOR DRIVING IN ROTATION WHEELS CARRIED BY THE LANDING GEAR

The invention relates to an aircraft landing gear equipped with means for driving in rotation wheels carried by the landing gear.

BACKGROUND OF THE INVENTION

Aircraft constructors are prompted for a number of reasons to attempt to motorize the wheels of aircraft, in particular by using drive actuators equipped with electric motors. Such a motorization in fact presents significant environmental and economical advantages (reduction of fuel consumption, reduction of noise during the taxiing phases, etc.) and makes it possible to provide new functions: piloting the aircraft on the ground remotely, manoeuvring the aircraft when the propulsion engines are switched off, taxiing in reverse, etc.

In addition to the problems posed by mass and cost, the designers and integrators of drive actuators are faced with a certain number of technical difficulties, in particular that of the deformation under load of the rim of the wheel, which makes it difficult to couple said wheel rim to a ring gear driven by the pinion of a drive actuator.

OBJECT OF THE INVENTION

The object of the invention is to reduce the cost and the mass of means for driving in rotation an aircraft wheel and to make these drive means more tolerant of a deformation of the rim of the wheel.

SUMMARY OF THE INVENTION

With a view to achieving this object, an aircraft landing gear is proposed, comprising an axle and a wheel, which comprises a rim mounted so as to turn on the axle about a first axis of rotation, first blocks protruding from a lateral face of the rim, said first blocks being adapted to cooperate with a gearwheel of a drive actuator carried by the landing gear, the gearwheel being mounted so as to rotate about a second axis of rotation perpendicular to the first axis of rotation.

The first blocks constitute a ring gear engaged by the gearwheel of the drive actuator, said ring gear being easy to produce, cost-effective and relatively lightweight since it is formed solely of first blocks and means for fixing said blocks to the rim. When the rim is deformed, the first blocks move, but are not distanced from the gearwheel of the actuator, which follows the displacement of the first blocks. The first blocks thus may still cooperate with the gearwheel of the actuator, such that the proposed drive is very tolerant of deformations.

BRIEF DESCRIPTION OF THE DRAWINGS

The invention will be better understood in light of the following description, which is given with reference to the figures of the accompanying drawings, in which:

FIG. 1 is a general view of a landing gear of the invention equipped with means for driving wheels in rotation;

FIG. 2 is a perspective view of a rim of a wheel of the landing gear and of a gearwheel of a drive actuator associated with the wheel;

FIG. 5 shows safety cables adapted to retain on the rim one or more first blocks in the case of accidental detachment of said blocks from the rim;

DETAILED DESCRIPTION OF THE INVENTION

Figures 3A, 3B:
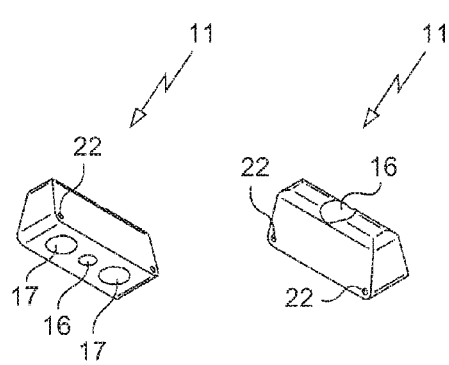
FIGS. 3a and 3b show first blocks in accordance with a first embodiment of the invention, said first blocks being adapted to cooperate with the gearwheel of the drive actuator.

The invention relates to an aircraft landing gear 1, visible in FIG. 1, bearing an axle 2 at the lower portion, said axle being intended to receive two wheels 3. Each wheel 3 comprises a rim 4, which carries a tyre 5 and which is mounted so as to turn on the axle 2 by means of bearings (not shown) about an axis of the axle or first axis of rotation X.

The landing gear 1 is also equipped with means 6 for driving in rotation wheels 3 carried by the landing gear 1, said drive means 6 comprising a drive actuator 7 associated with each wheel and carried by the landing gear. This drive actuator 7 comprises a gearwheel 8, which, when the drive actuator 7 is in a position referred to as the "engagement position", is adapted to engage with a ring gear 9 formed integrally with the wheel 3 of the aircraft.

The gearwheel 8 and the ring gear 9 associated with a wheel 3 will now be described in greater detail with reference to FIG. 1 and FIG. 2, in which merely a rim 4 of a wheel 3 and also the gearwheel 8 of the associated drive actuator 7 are shown.

The ring gear 9 is formed of first blocks 11, which protrude from the inner lateral face F of the rim 4 and which are carried on the circumference of this face F. The first blocks 11 extend in radial directions so as to form teeth, such that the axis of the ring gear 9 coincides with the axis of rotation of the wheel 3 of the aircraft or first axis of rotation X. The gearwheel 8 for its part is driven in rotation by a drive motor 12 of the drive actuator 7 associated with a gearing, and is mounted so as to rotate about a second axis of rotation Y perpendicular to the first axis of rotation X.

The first blocks 11 are thus adapted to cooperate with teeth 13 of the gearwheel 8 of the drive actuator 7.

The first blocks 11 and the teeth 13 of the gearwheel 8 have a shape adapted for the perpendicular engagement performed when the gearwheel 8 of the drive actuator 7 is in an engagement position for engaging with the ring gear 9. The shape of the first blocks 11 and of the teeth 13 makes it possible in particular to compensate for errors of angle and alignment produced by a potential deformation of the rim 4 of the wheel. The first blocks 11 are made for example of stainless steel and may be wearing parts.

The first blocks 11 are removable and are carried on the lateral face F of the rim 4 of the wheel 3 of the aircraft. The first blocks are thus mounted on the wheel 3 only when the landing gear of the aircraft is equipped with rotation drive means 6. The wheel 3 of the aircraft described here can thus be used both when the landing gear 1 is equipped with said drive means 6, in which case the wheel 3 is equipped with first blocks 11, and when the landing gear 1 is devoid of these drive means 6, in which this case the first blocks 11 are not mounted on the wheel 3.

Figure 4:
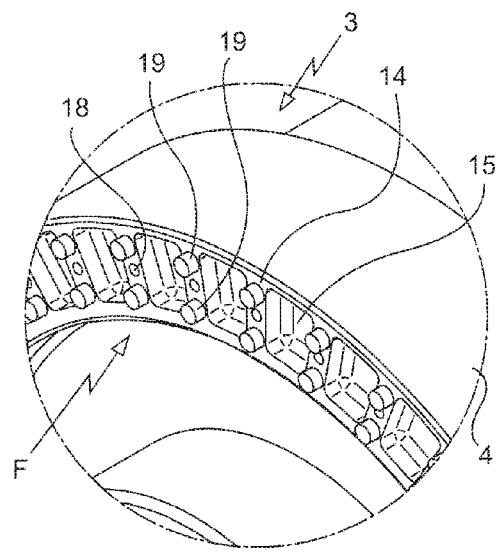
FIG. 4 shows radial supports of the rim on which the first blocks in accordance with the first embodiment of the invention are carried.

In a first embodiment of the invention visible in FIGS. 3a, 3b and 4, the lateral face F of the rim 4 of the wheel 3 is shaped so as to receive the first blocks 11. The lateral face F has radial supports 14 separated by indentations 15 and arranged over the circumference of the lateral face F. The first blocks 11 are carried on the radial supports 14. Each first block 11 comprises a smooth bored hole 16 passing through the first block 11 from one side to the other, and also two positioning holes 17. When the first block 11 is mounted on the corresponding radial support 14, the smooth bored hole 16 is lengthened by a tapped hole 18 arranged on the radial support 14, and the two positioning holes 17 receive two complementary pins 19 also arranged on the radial support 14.

Thus, in order to fix each first block 11 on the lateral face F of the rim 4, the first block 11 is positioned on the radial support 14 by means of the positioning holes 17 and the complementary pins 19, then the first block 11 is fixed on the radial support 14 by means of a screw extending into the smooth bored hole 16 and into the tapped hole 18.

It is of course possible to provide, for a given first block, a different number of smooth bored holes or tapped holes, screws, pins and positioning holes.

A first and a second safety cable 20, 21, visible in FIG. 5, advantageously run along the circumference of the lateral face F of the rim 4, passing through through-holes 22 formed in the first blocks 11. These safety cables 20, 21 make it possible to retain on the rim 4 a first block 11 in the case of accidental detachment of one or more first blocks 11 from the rim 4, for example in the case of accidental fracture of a fixing screw, etc.

Figures 6A, 6B:
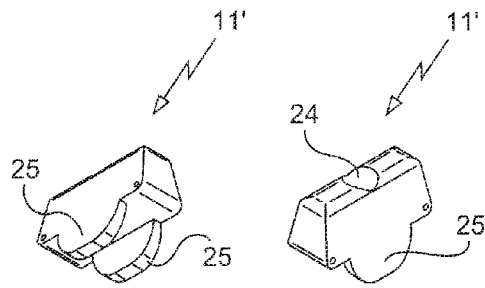
FIGS. 6a and 6b show first blocks in accordance with a second embodiment of the invention.

FIGS. 5a, 5b and 6 show a second embodiment of the invention with reference to a wheel 3' comprising a rim 4' having a lateral face F'. Each first block 11' comprises a smooth bored hole 24 passing through the first block 11' from one side to the other as well as two lateral positioning ears 25. When the first block 11' is mounted on a corresponding radial support 26, the smooth bored hole 24 is lengthened by a threaded hole 27 arranged on the radial support 26, and the two ears 25 extend in indentations 28 arranged on either side of the corresponding radial support 26 of the lateral face F' of the rim 4'.

Thus, in order to fix each first block 11' on the lateral face F' of the rim 4', the first block 11' is positioned on the radial support 26 by means of the ears 25, then said first block is fixed on the support 26 by means of a screw extending into the smooth bored hole 24 and into the threaded hole 27.

Advantageously, and with reference again to FIG. 2, the teeth 13 of the gearwheel 8 of the drive actuator 7 are second blocks 28 similar to the first blocks 11 or the first blocks 11' and have a shape adapted to engage perpendicularly with the ring gear 9 formed by the first blocks 11 or 11'. The gearwheel 8 thus comprises a hub 29, and the second blocks 28 are carried on the circumference of the hub 29.

It is of course also possible for the gearwheel 8 of the drive actuator 7 to be a conventional pinion with teeth of different shape.

Figure 7:
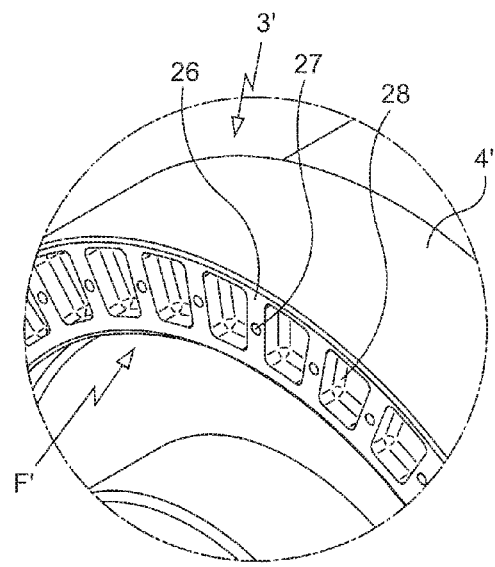
FIG. 7 shows radial supports of the rim on which the first blocks in accordance with the second embodiment of the invention are carried.

A particular advantageous implementation of the invention will now be described with reference to an aircraft landing gear 101 shown in FIGS. 7 to 9. This landing gear 101 carries an axle 102 at the lower part intended to receive a first wheel 103a and a second wheel 103b. Each wheel comprises a rim 104a, 104b carrying a tyre 105a, 105b and mounted in order to rotate on the axle, by means of bearings (not shown), about an axis of the axle or first axis of rotation X.

For each wheel rim 104a, 104b, a lateral inner face Fa, Fb of the rim is defined. The two lateral inner faces Fa, Fb of the first braked wheel 103a and of the second wheel 103b are opposite one another.

The landing gear 101 is also equipped with means 106 for driving in rotation wheels 103a, 103b according to a first embodiment mounted on the landing gear. The rotation drive means 106 comprise a first actuator 107a for driving in rotation the first wheel 103a, a second actuator 107b for driving in rotation the second wheel 103b, and also an engagement actuator 110.

The first and the second drive actuators 107a, 107b are intended to drive in rotation the wheels 103a, 103b when the aircraft is on the ground, thus enabling the displacement of the aircraft without using the propulsion engines thereof.

The driving in rotation of wheels by the drive actuators is typically implemented when the aircraft has a speed on the ground less than twenty knots and during a taxiing phase.

To drive the wheels of the aircraft in rotation, the first drive actuator 107a comprises a first gearwheel 108a adapted to engage with a first ring gear 109a, which is formed integrally with the first wheel 103a of the aircraft, and the second drive actuator 107b comprises a second gearwheel 108b adapted to engage with a second ring gear 109b, which is formed integrally with the second wheel 103b of the aircraft.

The first and second ring gear and the first and second gearwheel are equipped with first and second blocks, as described above.

The first and second gearwheels 108a, 108b are driven in rotation by a first and by a second electric drive motor 112a, 112b respectively, each electric drive motor being connected to a gearing.

Figure 8:
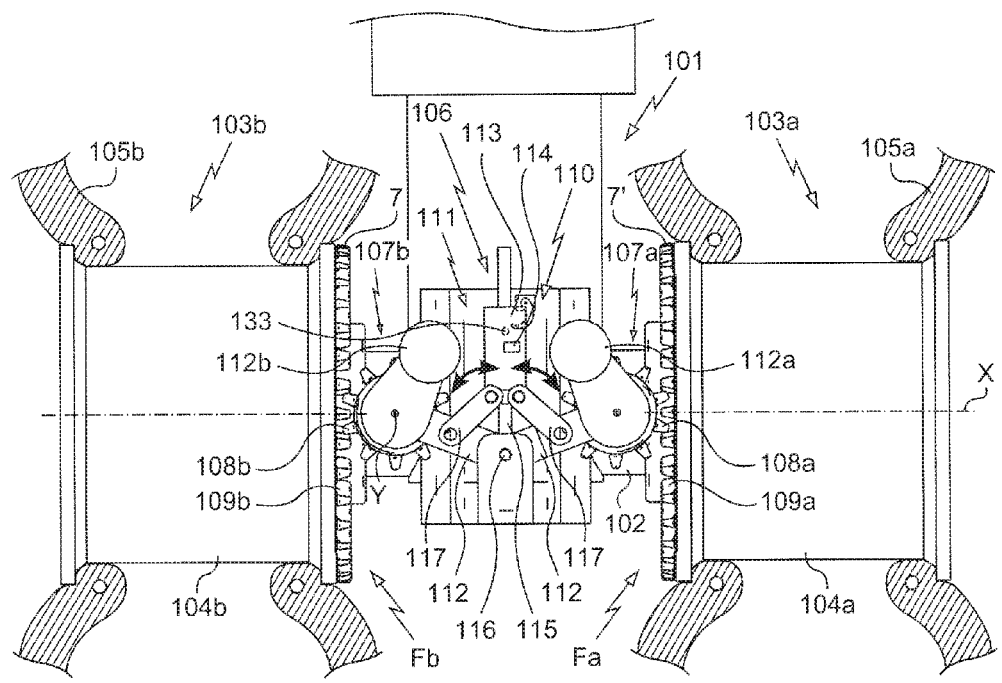
FIG. 8 is a front view of a landing gear of the invention equipped with drive means in accordance with a first embodiment, the drive actuators of these drive means being in an engagement position.
Figure 9:
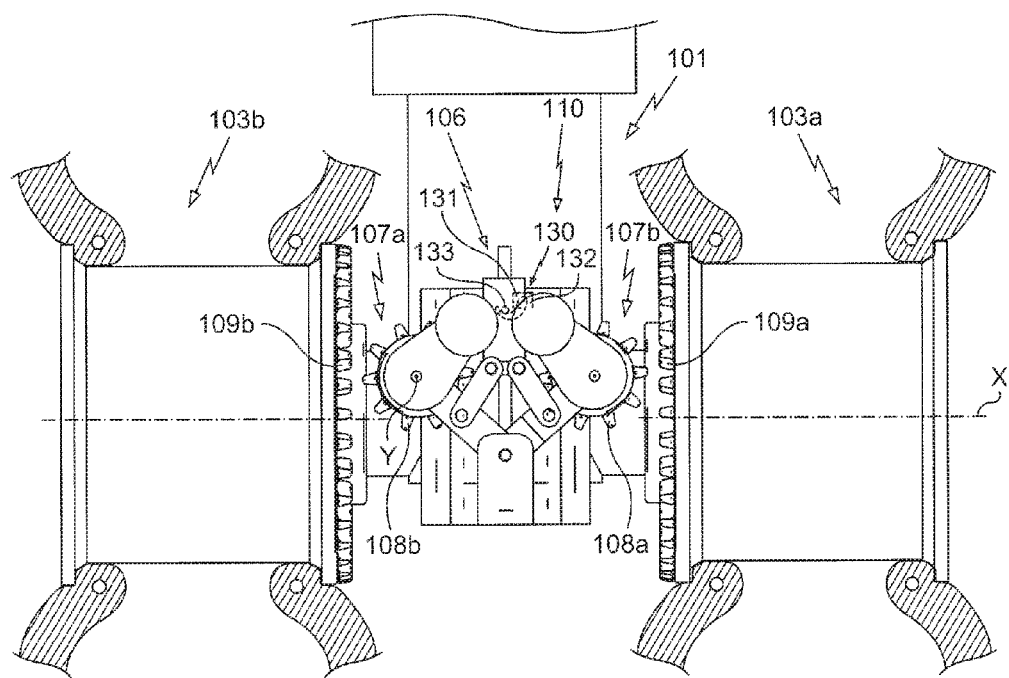
FIG. 9 is a front view of a landing gear of the invention equipped with drive actuators in accordance with the first embodiment in a release position.

The engagement actuator 110 carries the drive actuators 107a, 107b and is adapted to displace said drive actuators simultaneously between an engagement position, visible in FIG. 8, in which the first gearwheel 108a engages with the first ring gear 109a and the second gearwheel 108b engages with the second ring gear 109b, and a release position, visible in FIG. 9, in which the first and second gearwheels 108a, 108b are distanced from the first and second ring gears 109a, 109b. In the engagement position, each gearwheel 108a, 108b bears against the adjacent rim 104a, 104b, which makes it possible to provide the other gearwheel with a pressure necessary for said gearwheel to also bear against the adjacent rim.

Thus, the engagement actuator 110 can be controlled so as to bring the drive actuators 107a, 107b into an engagement position when the use thereof is required in order to drive the wheels 108a, 108b and therefore to displace the aircraft, and to bring the drive actuators 107a, 107b into a release position when the use thereof is not required, that is to say when the aircraft is not on the ground or when the aircraft is in a braking phase, or when the aircraft is displaced on the ground by means of other displacement means, for example by means of propulsion engines of the aircraft.

Here, the engagement actuator 110 is an electromechanical actuator comprising an actuation element 111 and two hinged arms 112 each bearing one of the drive actuators 107a, 107b.

The actuation element 111 comprises a first movable part, in this case a sliding cylindrical body 113, within which an electric engagement motor 114 is integrated, shown schematically in FIGS. 8 and 9, and a vertical rod 115, along which the cylindrical body 113 slides under the action of the engagement motor 114. Each of the arms 112 is hinged at fixed pivots 116 of the landing gear 101. Each of the arms 112 is also coupled by means of respective links 117 to the sliding cylindrical body 113 of the actuation element 111. Thus, a displacement of the sliding cylindrical body 113 under the action of the engagement motor 114 causes a simultaneous rotation of the two arms 112, which drives a displacement of the first and second drive actuators 107a, 107b toward the engagement position when the engagement motor 114 rotates in a certain direction, and toward the release position when the engagement motor 114 rotates in the other direction. The drive actuators 107a, 107b thus perform a rotary movement in order to pass into the drive position or into the release position.

A latching actuator 130 comprising an actuator body 131 and a latching hook 132 is mounted on the landing gear 101. The latching actuator 130 can be controlled so as to bring the hook 132 into a latching position, in which the hook 132 cooperates with a latching point 133 carried on the sliding body 113 in order to hold in position the sliding body 113 so as to block the drive actuators in the release position. The latching provided is then effective even when an electrical supply of the engagement actuator 110 or of the latching actuator 130 itself is unavailable.

An angular displacement of the sliding cylindrical body 113 of the engagement actuator 110 is advantageously permitted so as to compensate for a lateral displacement or a deformation of the rims 104a, 104b parallel to the axis X of the axle 102. Such a lateral displacement or such a deformation are particularly likely to occur during the taxiing of the aircraft. When the drive actuators 107a, 107b are in the engagement position, the lateral displacement or the deformation of the rim then produce a certain lateral displacement of the gearwheel of the corresponding drive actuator, and it is necessary to compensate for said lateral displacement.

Figure 10:
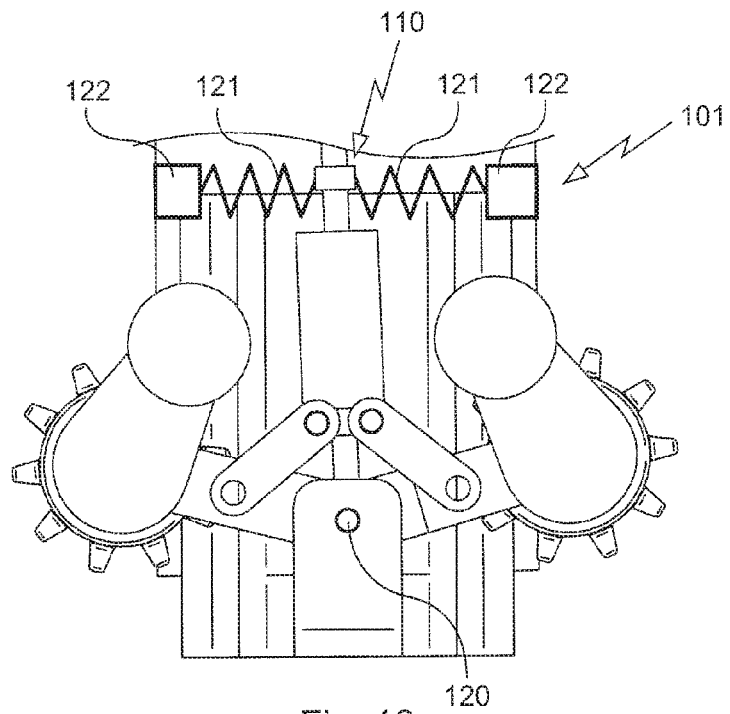
FIG. 10 shows a landing gear equipped with return springs for returning an actuator for engaging the drive means toward the position of equilibrium of said actuator.

For this, and with reference to FIG. 10, the engagement actuator 110 is mounted on the landing gear via a pivot joint 120 permitting an angular displacement of the engagement actuator 110. Two return springs 121 are each fixed at one end on a first support of the engagement actuator 110 integral with the rod 15 and at another end on a support 122 of the landing gear 101. The return springs 121 are intended to return the engagement actuator 110 to a position of equilibrium when the rims recover the normal position or shape thereof, this position of equilibrium being a position in which the lateral displacement of the engagement actuator 110 is substantially zero.

Figure 13:
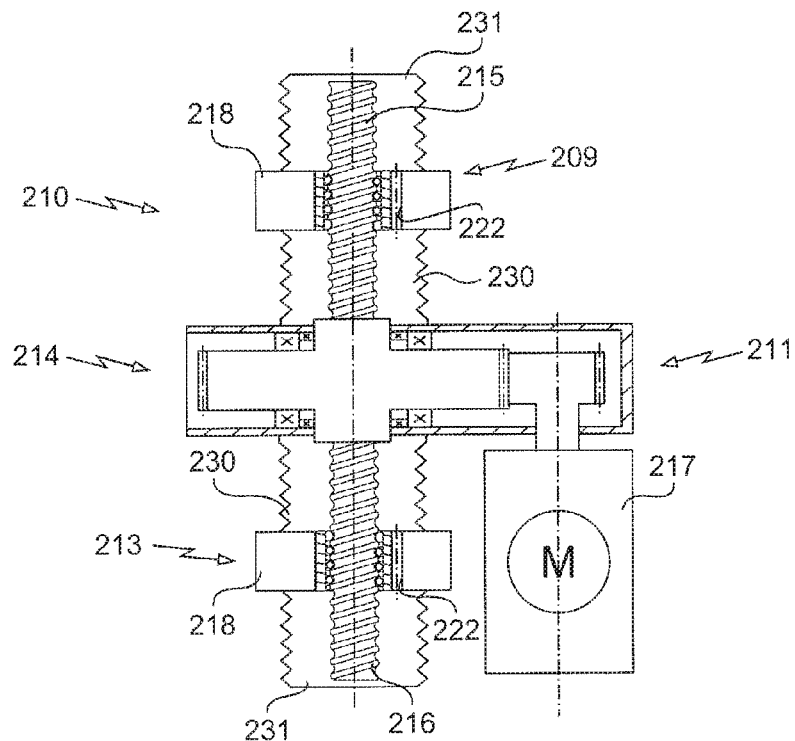
FIG. 13 schematically shows a sectional view of the actuator for engaging rotation drive means in accordance with the second embodiment.
Figure 11:
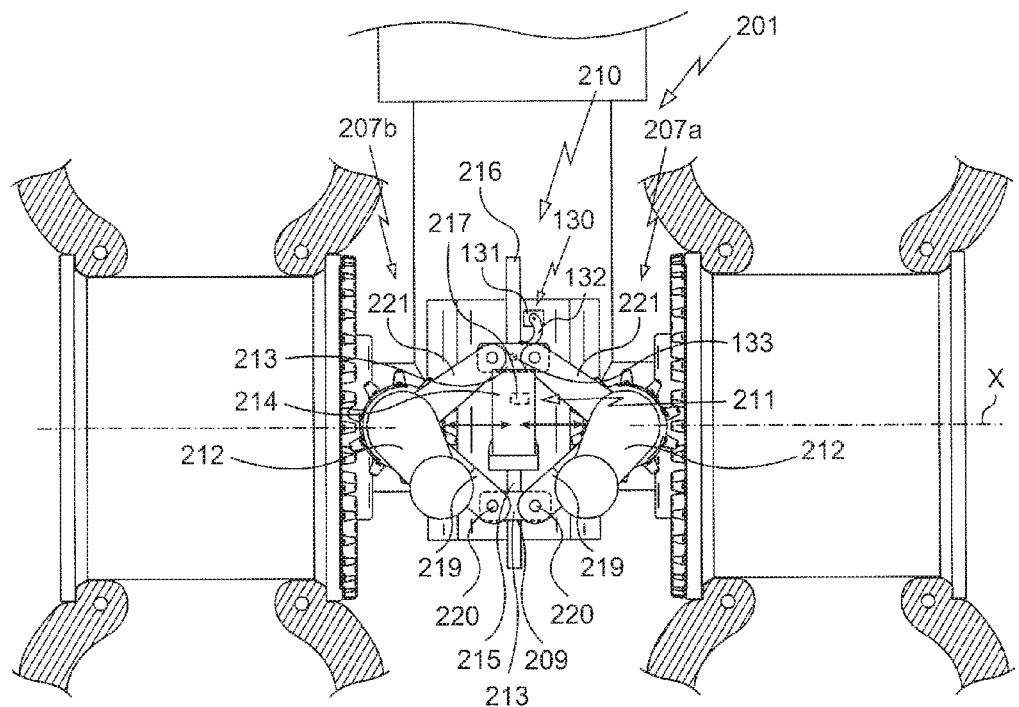
FIG. 11 is a front view of a landing gear of the invention equipped with drive means in accordance with a second embodiment, the drive actuators of these drive means being in an engagement position.
Figure 12:
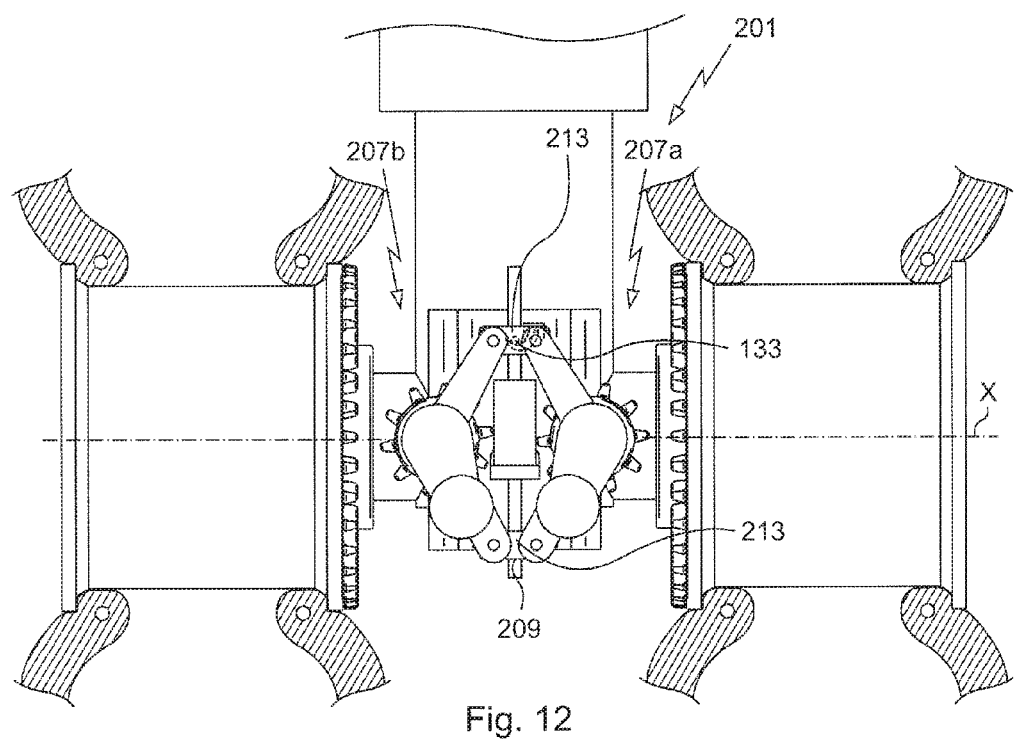
FIG. 12 is a front view of a landing gear of the invention equipped with drive actuators in accordance with the second embodiment in a release position.

In a second embodiment of the rotation drive means, visible in FIGS. 11 to 13, the engagement actuator 210 is an electromechanical actuator comprising an actuation element 211 and two hinged arms 212 each carrying one of the drive actuators 207a, 207b. The actuation element 211 comprises a first movable part 209, a second movable part 213, a fixed cylindrical body 214 and a first and a second coaxial screw 215, 216 having opposed thread directions. An electrical engagement motor 217 extends behind the fixed cylindrical body 214. The first and second movable parts 209, 213 each comprise a nut 218 cooperating by helical joint with the first screw 215 and the second screw 216 respectively, such that a simultaneous rotation of the screws 215, 216 by means of the engagement motor 217 causes a simultaneous axial displacement of the movable parts 209, 213 toward one another or away from one another. The helical joints are of the ball screw type here. In this second embodiment, the two hinged arms 219 are hinged at pivots 220 mounted on the second movable part 213 of the actuator. Each of the arms 219 is also coupled by means of respective links 221 to the first movable part 209 of the actuation element 211.

A latching actuator 130 similar to that described earlier is mounted on the landing gear 201. The hook 132 of the latching actuator 130 is adapted here to cooperate with a latching point carried on a movable part 213, so as to block the drive actuators in the release position.

Thus, a simultaneous rotation of the screws 215, 216 by means of the engagement motor 217 causes the simultaneous axial displacement of the movable parts 209, 213 toward one another or away from one another. When the engagement motor rotates in a certain direction, the movable parts 209, 213 move toward one another, which leads the drive actuators 207a, 207b into the drive position, which can be seen in FIG. 11. When the engagement motor rotates in the other direction, the movable parts 209, 213 move away from one another, which brings the drive actuators into the release position, which can be seen in FIG. 12. The drive actuators 207a, 207b thus perform a movement in translation in order to pass into the drive position or into the release position.

As can be seen in FIG. 13, the second embodiment requires the addition of sealing means to the engagement actuator 210, said sealing means making it possible to protect against any external attack on the different elements of the engagement actuator. The sealing means comprise bellows which extend between the fixed cylindrical body 214 and the free end of each screw 215, 216. Each screw 215, 216 is thus surrounded by a first bellows 230 and a by a second bellows 231. For each screw 215, 216, the first bellows 230 comprises a nozzle fixed to the fixed cylindrical body 214 and a nozzle fixed to the corresponding nut 218, and the second bellows 231 comprises a nozzle fixed to said nut 218 and a nozzle fixed to the end of the free end of the corresponding screw. An air circulation hole 222 is arranged on each nut 218 so as to allow a passage of air from one of the first or second nozzles 230, 231 in compressed form to the other nozzle in expanded form.

The invention is not limited to the specific embodiment that has just been described, but, by contrast, comprises any variant within the scope of the invention as defined by the claims.

Although it has been indicated in the description that the first blocks are carried on the lateral face of the rim of a wheel, it is possible to mount an intermediate mounting ring on the lateral face of the rim and to carry the first blocks on said intermediate mounting ring. The use of such an intermediate mounting ring in particular makes it possible to reduce the number of fixing supports on the rim and to reduce the impact of a deformation of the rim on the first blocks.

Although it has been indicated that the engagement actuator is mounted on the landing gear, this can of course be mounted on a support in turn fixed on the landing gear.

The invention claimed is:

1. An aircraft landing gear comprising:
   an axle (2), and
   a wheel (3, 3'),
   wherein said wheel comprises a rim (4, 4') mounted so as to rotate on the axle about a first axis of rotation (X), first blocks (11, 11') protruding from a lateral face (F, F') of the rim, said first blocks cooperating with a gearwheel (8) of a drive actuator (7) carried by the landing gear, the gearwheel being mounted rotatably about a second axis of rotation (Y) perpendicular to the first axis of rotation, and
   wherein said first blocks (11, 11') are mounted on the lateral face (F, F') of the rim.

2. Landing gear according to claim 1, wherein the first blocks (11, 11') are removable and are carried on the lateral face.

3. The aircraft landing gear according to claim 1, wherein a safety cable (20, 21) runs along the circumference of the lateral face of the rim and through first blocks so as to retain on the rim a first block in the case of accidental detachment of the first block from the rim.

4. The aircraft landing gear according to claim 1, wherein the gearwheel comprises:
   a hub (29) and
   second removable blocks (28), which are carried on the circumference of the hub.

5. An aircraft landing gear comprising:
   an axle (2), and
   a wheel (3, 3'),
   wherein said wheel comprises a rim (4, 4') mounted so as to rotate on the axle about a first axis of rotation (X), first blocks (11, 11') protruding from a lateral face (F, F') of the rim, said first blocks cooperating with a gearwheel (8) of a drive actuator (7) carried by the landing gear, the gearwheel being mounted rotatably about a second axis of rotation (Y) perpendicular to the first axis of rotation,
   wherein the first blocks (11, 11') are removable and are carried on the lateral face, and
   wherein the lateral face is shaped so as to have radial supports (14, 26) separated by indentations (15, 28), the first blocks being carried on the supports.

6. The aircraft landing gear according to claim 5, wherein at least one first block is fixed on a radial support by means of at least one screw passing through the block and screwed into the radial support.

7. The aircraft landing gear according to claim 5, wherein at least one first block comprises a positioning hole (17) complementary to a pin (19) arranged on the radial support on which the first block is carried.

8. The aircraft landing gear according to claim 5, wherein at least one first block comprises two positioning ears (25) intended to extend into indentations (28) arranged on either side of the support on which the first block is carried.

9. An aircraft landing gear comprising:
   an axle,
   first and second wheels (103a, 103b; 203a, 203b), each wheel comprising a rim (104a, 104b) mounted so as to rotate on the axle about a first axis of rotation,
   first blocks protruding from a lateral face of the rim of said first wheel and first blocks protruding from a lateral face of the rim of said second wheel,
   a first actuator (107a; 207a) for driving in rotation the first wheel comprising a first gearwheel (108a) engaging with the first blocks of the rim of the first wheel, the first gearwheel being mounted rotatably about a second axis of rotation that is perpendicular to the first axis of rotation,
   a second actuator (107b; 207b) for driving in rotation the second wheel comprising a second gearwheel (108b) adapted to engage with the first blocks of the rim of the second wheel, the second gearwheel being mounted rotatably about a third axis of rotation that is perpendicular to the first axis of rotation, and
   an engagement actuator (110; 210) carrying the drive actuators (107a, 107b; 207a, 207b) and adapted to displace said actuators simultaneously between an engagement position in which the first gearwheel engages with the first blocks of the rim of the first wheel and the second gearwheel engages with the first blocks of the rim of the second wheel, and a release position in which the first and second gearwheels are distanced from the rims of the first and second wheels.

10. The aircraft landing gear according to claim 9, wherein the engagement actuator (110; 210) comprises:
    an actuation element (111), and
    two hinged arms (112; 219), each carrying one of the drive actuators, each of the arms being coupled by means of respective links (117; 221) to a first movable part (113; 209) of the actuation element, such that a displacement of the movable part causes a simultaneous rotation of the two arms, which drives a displacement of the first and second drive actuators between the engagement position and the release position.

11. The aircraft landing gear according to claim 10, wherein the arms are hinged at fixed pivots (116) on the landing gear.

12. The aircraft landing gear according to claim 10, wherein the arms are hinged at pivots mounted on a second movable part (213) of the actuation element and rotatable about a fourth axis that is parallel to the second and third axes, the first and second movable parts being displaceable by the actuation element along a fifth axis toward one another or away from one another, said fifth axis being perpendicular to said second and third axes.

13. The aircraft landing gear according to claim 12, in which the first and second movable parts each comprise:
    a nut (218) cooperating by helical connection to a first screw (215), and
    a second screw (216) respectively,
    said first and second screws being coaxial and having opposite thread directions, such that a simultaneous rotation of the screws by means of a motor of the engagement actuator causes the simultaneous axial displacement of the movable parts toward one another or away from one another.

14. The aircraft landing gear according to claim 13, wherein the helical connection is a connection of the ball screw type. said second and third axes.

15. The aircraft landing gear according to claim 10, further comprising a latching actuator mounted on the landing gear and cooperating with the first or the second movable part so as to block the drive actuators in the release position.

16. The aircraft landing gear according to claim 9, wherein the engagement actuator (110) is mounted on the landing gear via a pivot connection allowing an angular displacement of the engagement actuator so as to compensate for a lateral displacement or a deformation of the rims parallel to an axis of the axle.

* * * * *